US009546617B2

(12) United States Patent
Fujimoto et al.

(10) Patent No.: US 9,546,617 B2
(45) Date of Patent: Jan. 17, 2017

(54) GASOLINE DIRECT-INJECTION ENGINE

(71) Applicant: Mazda Motor Corporation, Aki-gun, Hiroshima (JP)

(72) Inventors: Masahiko Fujimoto, Hiroshima (JP); Yoshitomo Takahashi, Hiroshima (JP); Yoshiyuki Koga, Aki-gun (JP); Hiroyuki Yamashita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 148 days.

(21) Appl. No.: 14/548,185

(22) Filed: Nov. 19, 2014

(65) Prior Publication Data
US 2015/0144095 A1 May 28, 2015

(30) Foreign Application Priority Data

Nov. 27, 2013 (JP) ................................. 2013-244883

(51) Int. Cl.
*F02B 11/00* (2006.01)
*F02D 41/40* (2006.01)
(Continued)

(52) U.S. Cl.
CPC ............... *F02D 41/403* (2013.01); *F02B 1/14* (2013.01); *F02B 23/101* (2013.01);
(Continued)

(58) Field of Classification Search
CPC F02D 41/403; F02D 41/0002; F02D 41/0025; F02D 41/182; F02D 13/0219; F02D 13/0269; F02D 2041/001; F02D 2041/389; F02D 2200/501; F02D 2200/602; F02M 27/04; F02M 25/12; F02B 23/101; F02B 1/14; F02B 77/11; F02F 3/10; F05C 2251/048; Y02T 1010/125; Y02T 1010/142; Y02T 1010/18; Y02T 1010/44
(Continued)

(56) References Cited

U.S. PATENT DOCUMENTS 6,530,361 B1 * 3/2003 Shiraishi ................... F02B 1/12
123/305
7,464,689 B2 * 12/2008 Siewert ................. F02D 41/402
123/299

(Continued)

FOREIGN PATENT DOCUMENTS

JP 2013057268 A 3/2013

*Primary Examiner* — Hieu T Vo
*Assistant Examiner* — Arnold Castro
(74) *Attorney, Agent, or Firm* — Alleman Hall McCoy Russell & Tuttle LLP

(57) ABSTRACT

A gasoline direct-injection engine is provided. The engine causes a self-ignition of a fuel injected into a cylinder by an injector and at least containing gasoline. The engine includes a controller for controlling the fuel injection by the injector. A geometric compression ratio of the engine is 15:1 or higher. The controller causes the injector to perform a pre-injection for keeping a variation of an in-cylinder temperature after a compression top dead center within a predetermined temperature range by injecting an amount of the fuel that causes an oxidative reaction without resulting in a hot flame reaction. The controller causes the injector to perform a main injection for causing self-ignition combustion of the fuel after the compression top dead center while the variation of the in-cylinder temperature is kept within the predetermined temperature range, by injecting the fuel after the pre-injection.

10 Claims, 11 Drawing Sheets

(51) Int. Cl.
*F02B 1/14* (2006.01)
*F02D 41/00* (2006.01)
*F02B 23/10* (2006.01)
*F02M 25/12* (2006.01)
*F02M 27/04* (2006.01)
*F02D 13/02* (2006.01)
*F02D 41/38* (2006.01)
*F02B 77/11* (2006.01)
*F02D 41/18* (2006.01)
*F02F 3/10* (2006.01)

(52) U.S. Cl.
CPC ..... *F02D 13/0219* (2013.01); *F02D 41/0025* (2013.01); *F02M 25/12* (2013.01); *F02M 27/04* (2013.01); *F02B 77/11* (2013.01); *F02D 13/0269* (2013.01); *F02D 41/0002* (2013.01); *F02D 41/182* (2013.01); *F02D 2041/001* (2013.01); *F02D 2041/389* (2013.01); *F02D 2200/501* (2013.01); *F02D 2200/602* (2013.01); *F02F 3/10* (2013.01); *F05C 2251/048* (2013.01); *Y02T 10/125* (2013.01); *Y02T 10/142* (2013.01); *Y02T 10/18* (2013.01); *Y02T 10/44* (2013.01)

(58) Field of Classification Search
USPC .............. 123/299, 300, 446, 478, 294, 27 R; 701/103, 104
See application file for complete search history.

(56) References Cited

U.S. PATENT DOCUMENTS

| | | | |
|---|---|---|---|
| 2002/0053336 A1* | 5/2002 | Nogi | F01L 1/34 123/299 |
| 2002/0195078 A1* | 12/2002 | Hasegawa | F01L 1/34 123/294 |
| 2009/0229581 A1* | 9/2009 | Ikeda | B01D 53/32 123/536 |
| 2012/0016571 A1* | 1/2012 | Nada | F02D 41/3035 701/104 |
| 2012/0253640 A1* | 10/2012 | Nada | F02D 41/403 701/103 |
| 2013/0340720 A1* | 12/2013 | Kuzuyama | F02D 41/402 123/478 |
| 2014/0216396 A1* | 8/2014 | Yamashita | F02B 11/00 123/297 |

* cited by examiner

GASOLINE DIRECT-INJECTION ENGINE

BACKGROUND

The present invention relates to a gasoline direct-injection engine.

Conventionally, gasoline direct-injection engines which supply a fuel at least containing gasoline into a cylinder and cause the fuel to self-ignite by compressing mixture gas have been known.

For example, JP2013-057268A discloses an engine for causing a self-ignition combustion of a fuel. In order to reduce a pressure increase rate within a cylinder (a rate of a pressure change inside a cylinder with respect to a crank angle change), the engine controls a combustion timing so that a timing at which the pressure increase rate during motoring of the engine becomes the largest negative value (lowest rate) overlaps with a combustion period. Specifically, the pressure increase rate during the motoring becomes its highest value slightly before a compression top dead center (CTDC), becomes zero at the CTDC, becomes a negative value after the CTDC, and then eventually becomes the largest negative value. In other words, the engine retards an ignition timing of the self-ignition combustion to a predetermined timing on the expansion stroke to overlap the combustion period with the timing at which the pressure increase rate during the motoring becomes the largest negative value. Thus, the pressure increase rate in the combustion is reduced and a vibration noise (NVH) level is reduced.

Note that the phrase "during motoring of the engine" used herein indicates a state of the engine with no combustion while a crankshaft of the engine is rotated by an electric motor, and it is used in research studies for, for example, a comparison of the pressure increase rate within the cylinder based on whether or not there is combustion.

However, since an in-cylinder temperature decreases as the expansion stroke progresses, if the ignition timing is retarded excessively, there is a risk of causing misfire. Particularly, since a decreasing speed of the in-cylinder temperature on the expansion stroke is higher as the compression ratio of the engine is higher, the ignition timing cannot be retarded very much.

SUMMARY

The present invention is made in view of the above situations and aims to extend a period for which a self-ignition combustion can be retarded.

According to an aspect of the present invention, a gasoline direct-injection engine is provided. The engine causes a self-ignition of a fuel injected into a cylinder by an injector and at least containing gasoline. The engine includes a controller for controlling the fuel injection by the injector. A geometric compression ratio of the engine is 15:1 or higher. The controller causes the injector to perform a pre-injection for keeping a variation of an in-cylinder temperature after a compression top dead center within a predetermined temperature range by injecting an amount of the fuel that causes an oxidative reaction without resulting in a hot flame reaction. The controller causes the injector to perform a main injection for causing the self-ignition combustion of the fuel after the compression top dead center and while the variation of the in-cylinder temperature is kept within the predetermined temperature range, by injecting the fuel after the pre-injection.

According to the above configuration, since the engine has the geometric compression ratio comparatively high as 15:1 or higher, a compression increase rate in the combustion tends to increase. In other words, with the engine, a vibration noise (NVH) level tends to become high.

However, since the variation of the in-cylinder temperature after the compression top dead center is kept within the predetermined temperature range by the pre-injection, a decrease of the in-cylinder temperature is suppressed. Thus, even if an ignition timing is retarded, the self-ignition combustion can be achieved without causing misfire. In other words, the pre-injection keeps, within the predetermined temperature range, the variation of the in-cylinder temperature from the compression top dead center until the fuel provided by the main injection ignites.

In this manner, the self-ignition combustion can be retarded until a combustion period of the self-ignition combustion overlaps with a timing at which a pressure increase rate during the motoring becomes a negative highest value, or until a combustion center of the self-ignition combustion overlaps with a period in which a negative pressure increase rate is high (10° to 20° after the compression top dead center). As a result, the pressure increase rate in the combustion can be reduced and the vibration noise (NVH) level can be reduced.

Further, by keeping the variation of the in-cylinder temperature within the predetermined temperature range, not only the in-cylinder temperature decrease can be suppressed, but also the in-cylinder temperature can be prevented from becoming excessively high. If the in-cylinder temperature becomes excessively high, when the main injection is performed, the fuel is locally ignited before being suitably mixed with air, and soot may be generated. In other words, by keeping the variation of the in-cylinder temperature within the predetermined temperature range, the generation of soot can be reduced.

Moreover, preventing the in-cylinder temperature from becoming excessively high while suppressing the decrease of the in-cylinder temperature can be achieved by causing the oxidative reaction of the fuel without resulting in a hot flame reaction. When the fuel causes a hot flame reaction, a large heat amount is generated and the in-cylinder temperature may become excessively high, whereas, when the fuel causes the oxidative reaction without resulting in a hot flame reaction, only a small heat amount is generated and the excessive increase of the in-cylinder temperature can be suppressed. Here, the oxidative reaction of the fuel without resulting in a hot flame reaction is referred to as "the partial oxidative reaction."

Furthermore, to reduce the pressure increase rate in the combustion, one can also consider increasing an EGR amount. However, if the EGR amount is increased, a fresh air amount is reduced. As a result, sufficient torque may not be secured. Particularly, the pressure increase rate may become an issue in the high engine load operating range depending on the value of the rate, and a large torque is required within the high engine load operating range. Therefore, with the configuration of maintaining the in-cylinder temperature by the pre-injection described above, since the fresh air amount can be secured, sufficient torque can be generated.

Here, an upper limit value of the predetermined temperature range is lower than a temperature at which the fuel injected in the main injection ignites before being mixed with the air inside the cylinder. For example, the upper limit value is higher than the in-cylinder temperature at the compression top dead center by 50 degrees. A lower limit value of the predetermined temperature range is higher than a temperature obtained by performing the motoring to reduce the in-cylinder temperature at the compression top dead center. Since the heat amount is not generated by the combustion during the motoring, the in-cylinder temperature after the compression top dead center decreases according to the change of an in-cylinder volume. For example, the lower limit value is lower than the in-cylinder temperature at the compression top dead center by 50 degrees. In other words, by the pre-injection, the in-cylinder temperature from the compression top dead center until a main combustion occurs is maintained to be lower than the temperature at which the fuel injected in the main injection ignites before being mixed with the air inside the cylinder, and higher than the temperature obtained by performing the motoring to reduce the in-cylinder temperature at the compression top dead center.

The predetermined temperature range may be 100 degrees in width.

The in-cylinder temperature may be between 1,000K and 1,100K while the variation of the in-cylinder temperature is kept within the predetermined temperature range.

An in-cylinder pressure may be reduced to be lower than an in-cylinder pressure at the compression top dead center while the variation of the in-cylinder temperature is kept within the predetermined temperature range.

In other words, the in-cylinder pressure is increased substantially to a value at which the fuel provided by the pre-injection causes the oxidative reaction but not to a value at which a hot flame reaction is caused. Therefore, similarly to temperatures during the motoring, the in-cylinder temperature after the compression top dead center is lower than the in-cylinder pressure at the compression top dead center. In other words, even when a heat amount substantially suppresses the decrease of the in-cylinder temperature after the compression top dead center by the pre-injection, since the in-cylinder pressure is not increased much, the effect of reducing the pressure increase rate in the combustion by retarding the self-ignition combustion is not lost.

Moreover, in the pre-injection, the fuel may be injected by an amount with which an air excess ratio becomes 8 or higher.

According to this configuration, the fuel provided by the pre-injection causes the oxidative reaction without causing a hot flame reaction. As a result, the fuel provided by the pre-injection generates a heat amount that can substantially suppress the decrease of the in-cylinder temperature without excessively increasing the in-cylinder temperature.

With respect to a total injection amount of the fuel including the pre-injection and the main injection, a ratio of the injection amount of the fuel of the main injection may be ¾ or higher.

According to this configuration, the fuel amount injected in the main injection can be secured sufficiently. Thus, a sufficient torque can be generated by the combustion of the fuel provided by the main injection.

The controller may advance the combustion caused by the main injection, as an engine speed increases.

In other words, as the engine speed becomes lower, a period of time for which the fuel is exposed to a high temperature inside the cylinder becomes longer, and an abnormal combustion becomes easier to occur. Therefore, as the engine speed becomes lower, the combustion caused by the main injection is retarded to suppress the occurrence of an abnormal combustion. On the other hand, as the engine speed becomes higher, the time period for which the fuel is exposed to the high temperature inside the cylinder becomes shorter, and it becomes more difficult for an abnormal combustion to occur. Therefore, although the combustion caused by the main injection is basically retarded to reduce the pressure increase rate in the combustion, the combustion timing is advanced as the engine speed becomes higher compared to when the engine speed is lower.

The engine may also include an ozone generator for generating ozone within the cylinder. The controller may cause the ozone generator to generate ozone after the main injection.

According to this configuration, ozone can assist the ignition of the combustion caused by the main injection. For example, when the retard period is long, ignition becomes difficult since the in-cylinder temperature is low. In such a case, the ignition of the fuel can be facilitated by ozone application.

DETAILED DESCRIPTION OF EMBODIMENTS

First Embodiment

Hereinafter, one illustrative embodiment of the present invention is described with reference to the appended drawings.

Figure 1:
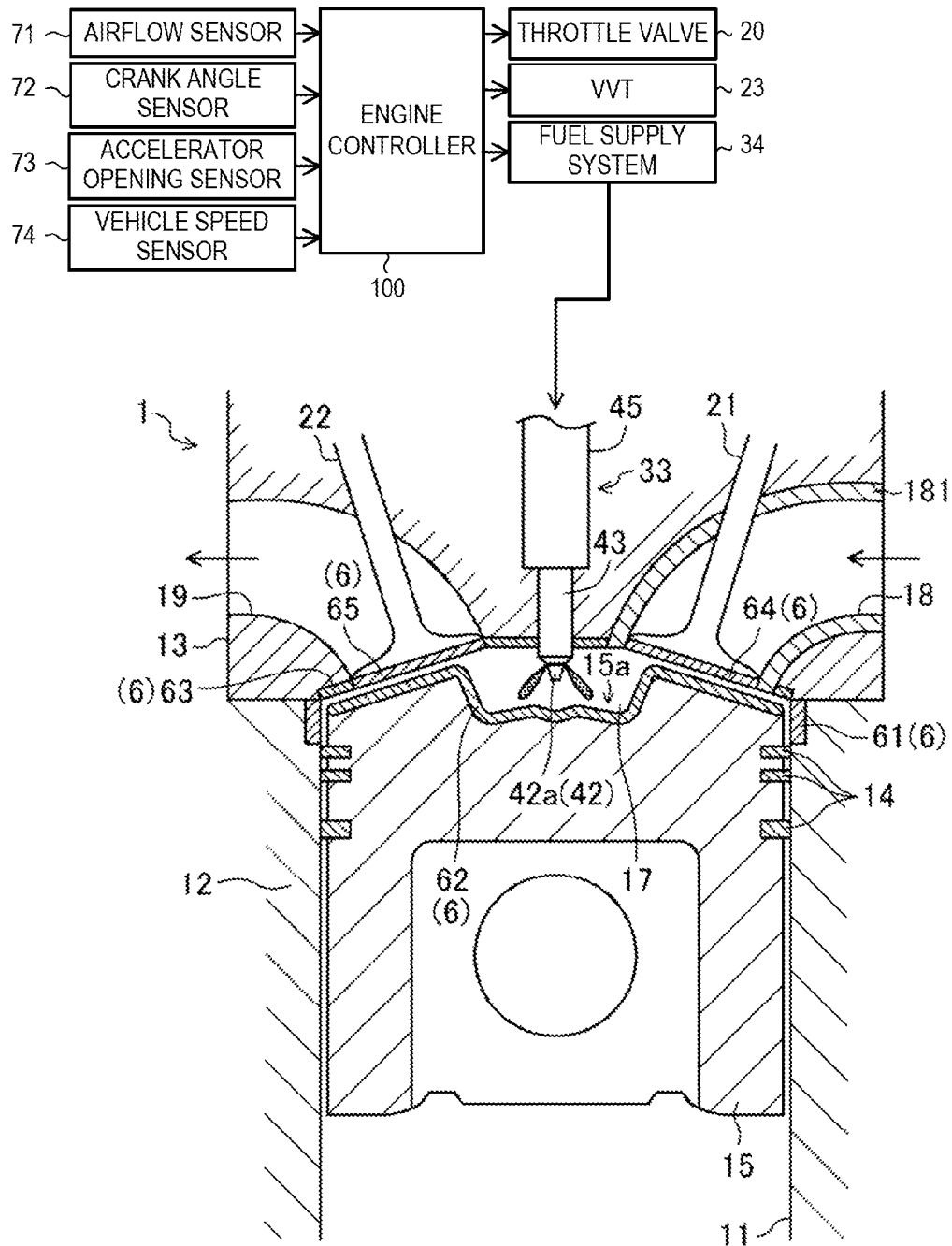
FIG. 1 is a schematic view illustrating a gasoline direct-injection engine according to a first embodiment of the present invention.

FIG. 1 is a schematic view illustrating a gasoline direct-injection engine (hereinafter, referred to as the "engine") 1 according to the first embodiment of the present invention. In this embodiment, the engine 1 includes various actuators and various sensors associated with an engine body of the engine 1, and an engine controller 100 for controlling the actuators based on signals from the sensors.

The engine 1 is installed in a vehicle (e.g., automobile), and an output shaft of the engine 1 is, although not illustrated, coupled to drive wheels via a transmission. An output of the engine 1 is transmitted to the drive wheels so as to drive the vehicle. The engine body of the engine 1 includes a cylinder block 12 and a cylinder head 13 placed on the cylinder block 12. A plurality of cylinders 11 are formed inside the cylinder block 12 (only one cylinder is illustrated in FIG. 1). A water jacket (not illustrated) through which cooling water flows is formed inside the cylinder block 12 and the cylinder head 13.

Pistons 15 are reciprocatably inserted into the cylinders 11, respectively. Each piston 15 forms a combustion chamber 17 together with the cylinder 11 and the cylinder head 13. In this embodiment, the combustion chamber 17 is a so-called pent-roof type, and a ceiling face of the combustion chamber 17 (a bottom face of the cylinder head 13) has a triangular roof-like shape formed by an intake-side inclined face portion and an exhaust-side inclined face portion. A crown face of the piston 15 has a bulging shape corresponding to the ceiling face, and a concave cavity 15a is formed in a center portion of the crown face. Note that each of the shapes of the ceiling face and the crown face of the piston 15 may be any shape as long as a high geometric compression ratio described later can be achieved, and for example, each of the ceiling face and the crown face of the piston 15 (except the portion corresponding to the cavity 15a) may be formed by a face perpendicular to a central axis of the cylinder 11, or the ceiling face may have the triangular roof-like shape as described above while the crown face of the piston 15 (except the portion corresponding to the cavity 15a) is formed by the face perpendicular to the central axis of the cylinder 11.

Although only one is illustrated in FIG. 1, two intake ports 18 are formed in the cylinder head 13 for each cylinder 11, and they communicate with the combustion chamber 17 by opening to the bottom face of the cylinder head 13 (the intake-side inclined face portion of the ceiling face of the combustion chamber 17). Similarly, two exhaust ports 19 are formed in the cylinder head 13 for each cylinder 11, and they communicate with the combustion chamber 17 by opening to the bottom face of the cylinder head 13 (the exhaust-side inclined face portion of the ceiling face of the combustion chamber 17). The intake ports 18 are connected with an intake passage (not illustrated) through which fresh air to be introduced into the cylinder 11 flows. A throttle valve 20 for adjusting an intake air flow rate is provided within the intake passage, and an opening of the throttle valve 20 is adjusted based on a control signal (desired throttle opening signal described later) from the engine controller 100. On the other hand, the exhaust ports 19 are connected with an exhaust passage (not illustrated) through which burned gas (exhaust gas) from the cylinder 11 flows. An exhaust gas purification system (not illustrated) having one or more catalyst converters is disposed in the exhaust passage. Each catalyst converter includes a three-way catalyst.

Intake valves 21 and exhaust valves 22 are disposed in the cylinder head 13 so as to shut off (close) the intake ports 18 against the combustion chamber 17 and shut off (close) the exhaust ports 19 against the combustion chamber 17, respectively. Each intake valve 21 is operated by an intake valve operating mechanism, and each exhaust valve 22 is operated by an exhaust valve operating mechanism. The intake and exhaust valves 21 and 22 reciprocate at predetermined timings to open and close the intake and exhaust ports 18 and 19, respectively, and thus, gas within the cylinder 11 is exchanged. The intake and exhaust valve operating mechanisms (not illustrated) have respective intake and exhaust camshafts operably coupled to a crankshaft, and the intake and exhaust camshafts rotate in synchronization with a rotation of the crankshaft. Moreover, at least the intake valve operating mechanism includes a hydraulic/mechanical variable phase mechanism (Variable Valve Timing: VVT) 23 for continuously varying a phase of the intake camshaft within a predetermined angle range. Note that a variable lift mechanism (Continuous Variable Valve Lift: CVVL) for continuously varying a valve lift may be provided along with the VVT 23.

An injector 33 for directly injecting the fuel into the cylinder (the combustion chamber 17) is disposed in the cylinder head 13, on the central axis of the cylinder 11. The injector 33 is fixedly attached to the cylinder head 13 by a well-known structure, such as using a bracket. A tip of the injector 33 is oriented toward a central position of the ceiling portion of the combustion chamber 17.

Figure 2:
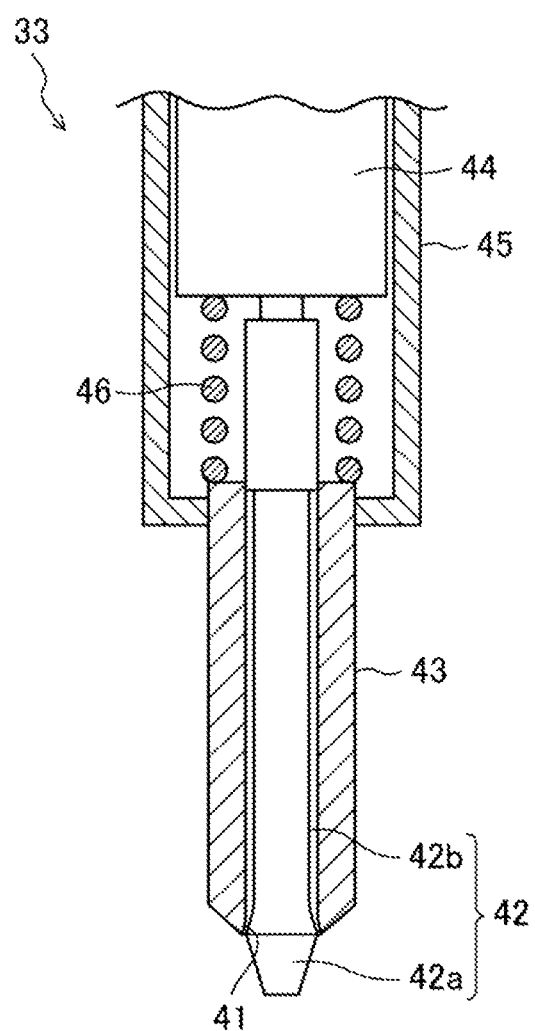
FIG. 2 is a cross-sectional view illustrating an internal structure of an injector.

As illustrated in FIG. 2, the injector 33 is an outward-opening valve injector, having an outward-opening valve 42 for opening and closing a nozzle port 41 from which the fuel is injected into the cylinder. In a tip portion of a fuel tube 43 extending along the central axis of the cylinder 11, the nozzle port 41 is formed in a tapering shape in which its diameter is larger toward the tip. A base end portion of the fuel tube 43 is connected with a case 45 provided therein with a piezo element 44. The outward-opening valve 42 has a valve body 42a and a coupling part 42b extending through the fuel tube 43 from the valve body 42a and connected with the piezo element 44. A portion of the valve body 42a on the coupling part 42b side has substantially the same shape as the nozzle port 41, and when this portion contacts with (is seated on) the nozzle port 41, the nozzle port 41 is in a closed state. Here, a tip-side portion of the valve body 42a is in a state of protruding outside the fuel tube 43.

The piezo element 44 is deformed by applying a voltage, so as to press the outward-opening valve 42 toward the combustion chamber 17 in the central axial direction of the cylinder 11. Thus, the outward-opening valve 42 in the closed state of the nozzle port 41 is lifted to open the nozzle port 41. Here, fuel is injected into the cylinder from the nozzle port 41, in a cone shape (specifically, hollow cone shape) centering on the central axis of the cylinder 11. A tapering angle of the cone is between 90° and 100° (a tapering angle of an inner hollow section is about 70°) in this embodiment. Further, when the voltage application to the piezo element 44 is stopped, the piezo element 44 resumes back to the previous state, and thus, the outward-opening valve 42 causes the nozzle port 41 to be in the closed state again. Here, a compression coil spring 46 disposed, within the case 45, around the coupling part 42b that assists the resumption of the piezo element 44.

As the voltage applied to the piezo element 44 becomes larger, a lift of the outward-opening valve 42 from the state in which the nozzle port 41 is closed (hereinafter, simply referred to as the lift) becomes larger. As the lift becomes larger, the opening of the nozzle port 41 becomes larger and the penetration of the fuel spray into the cylinder from the nozzle port 41 becomes stronger (longer), the amount of the fuel injected per unit time increases, and the particle diameter of the fuel spray becomes larger. The response of the piezo element 44 is prompt, and therefore, a later-described injection can be achieved easily. Note that the operation of the outward-opening valve 42 is not limited to be performed by the piezo element 44.

A fuel supply system 34 includes an electric circuit for operating the outward-opening valve 42 (piezo element 44), and a fuel supply subsystem for supplying the fuel to the injector 33. The engine controller 100 outputs to the electric circuit at a predetermined timing, an injection signal (fuel injection pulse) having a voltage corresponding to the lift, so as to actuate the piezo element 44 and the outward-opening valve 42 via the electric circuit. Thus, a desired amount of fuel is injected into the cylinder. When the injection signal is not outputted (when the voltage of the injection signal is zero), the nozzle port 41 is in the state of being closed by the outward-opening valve 42. The operation of the piezo element 44 is controlled as above, by the injection signal from the engine controller 100. Thus, the engine controller 100 controls the operation of the piezo element 44 to control the fuel injection from the nozzle port 41 of the injector 33 and the lift in the fuel injection.

In the fuel supply subsystem, a high-pressure fuel pump and a common rail (both not illustrated) are provided, and the high-pressure fuel pump pumps the fuel supplied from a fuel tank via a low-pressure fuel pump to the common rail, and the common rail stores the pumped fuel at a predetermined fuel pressure. When the injector 33 is activated (the outward-opening valve 42 is lifted), the fuel stored in the common rail is injected from the nozzle port 41.

Here, although the fuel of the engine 1 of this embodiment is gasoline, it may be gasoline containing bioethanol, and the fuel may be any fuel (liquid fuel) as long as it contains at least gasoline.

The engine controller 100 is a controller based on a well-known microcomputer, and it includes a central processing unit (CPU) for executing a program, a memory comprised of, for example, a RAM and a ROM for storing the program and data, and an input/output (I/O) bus for inputting and outputting electric signals. The engine controller 100 is one example of the controller in the claims.

The engine controller 100 at least receives a signal regarding the intake air flow rate from an airflow sensor 71, a crank angle pulse signal from a crank angle sensor 72, an accelerator opening signal from an accelerator opening sensor 73 for detecting a stepped amount of an acceleration pedal, and a vehicle speed signal from a vehicle speed sensor 74. Based on these input signals, the engine controller 100 obtains control parameters of the engine 1, such as the desired throttle opening signal, the fuel injection pulse, an ignition signal, and a valve phase angle signal. Further, the engine controller 100 outputs the signals to the throttle valve 20 (a throttle actuator for operating the throttle valve 20), the fuel supply system 34 (electric circuit described above), the VVT 23, etc.

A geometric compression ratio $\epsilon$ of the engine 1 is between 15:1 and 40:1. The geometric compression ratio $\epsilon$ is particularly preferably between 25:1 and 35:1. With the engine 1 of this embodiment, "compression ratio=expansion ratio." Therefore, the engine 1 has a comparatively high expansion ratio, as well as a high compression ratio. Note that a configuration in which "compression ratio≤expansion ratio" (e.g., Atkinson cycle or Miller cycle) may be adopted. Moreover, in a case of retarding a close timing of the intake valve, an effective compression ratio of the engine 1 is set to 12:1 or higher. Preferably, the effective compression ratio of the engine 1 is set to 18:1 or higher.

As illustrated in FIG. 1, the combustion chamber 17 is formed by the wall face of the cylinder 11, the crown face of the piston 15, the bottom face of the cylinder head 13 (ceiling face), and faces of valve heads of the intake and exhaust valves 21 and 22. Hereinafter, each of the faces forming the combustion chamber 17 may be referred to as the "partial face". Further, to reduce a cooling loss, heat-insulating layers 61, 62, 63, 64, and 65 are provided to the respective partial faces to heat-insulate the combustion chamber 17. Note that, hereinafter, the heat-insulating layers 61 to 65 may collectively be referred to as the heat-insulating layer 6. The heat-insulating layer 6 may be provided to all of the partial faces, and may be provided only to a part of each partial face or one or more of the partial faces. Moreover, in FIG. 1, the heat-insulating layer 61 of the cylinder wall face is provided at a position higher than a piston ring 14 in a state in which the piston 15 is at a top dead center (TDC), so that the piston ring 14 does not slide on the heat-insulating layer 61. Note that the heat-insulating layer 61 of the cylinder wall face is not limited to this configuration and, by extending the heat-insulating layer 61 downward, it may be provided over the entire stroke of the piston 15 or a part of the stroke. Moreover, although it is not a wall face directly forming the combustion chamber 17, a heat-insulating layer may be provided to a part of each of the wall faces of the intake ports 18 and/or the exhaust ports 19, near the openings of the corresponding ports on the side of the ceiling face of the combustion chamber 17. Note that the thicknesses of the respective heat-insulating layers 61 to 65 in FIG. 1 are merely an illustration and do not indicate their actual thicknesses, and they also do not indicate the dimensional relationships among the heat-insulating layers of the respective faces in terms of thickness.

The heat-insulating structure of the combustion chamber 17 is described in more detail. As described above, the heat-insulating structure of the combustion chamber 17 is formed by the heat-insulating layers 61 to 65 provided to the respective partial faces forming the combustion chamber 17. A heat conductivity of each of the heat-insulating layers 61 to 65 is set lower than a metal mother member constituting the combustion chamber 17 so as to suppress the heat of combustion gas within the combustion chamber 17 from being released through the respective partial faces. Here, the cylinder block 12 is the mother member for the heat-insulating layer 61 provided to the wall face of the cylinder 11, the piston 15 is the mother member for the heat-insulating layer 62 provided to the crown face of the piston 15, the cylinder head 13 is the mother member for the heat-insulating layer 63 provided to the bottom face of the cylinder head 13 (ceiling face), and the intake and exhaust valves 21 and 22 are the mother members for the respective heat-insulating layers 64 and 65 provided to the valve head faces of the intake and exhaust valves 21 and 22. Therefore, as the material of the mother member, either one of aluminum alloy and cast iron is adopted for the cylinder block 12, the cylinder head 13 and the piston 15, and any one of heat-resistant steel, cast iron and the like is adopted for the intake and exhaust valves 21 and 22.

Moreover, the heat-insulating layer 6 preferably has a volumetric specific heat smaller than the mother member, in view of reducing cooling loss. Specifically, although a gas temperature within the combustion chamber 17 varies depending on the progression of the combustion cycle, with a conventional engine without the heat-insulating structure of the combustion chamber 17, the cooling water flows inside the water jacket formed in the cylinder head and the cylinder block and, thus, the temperature of each face forming the combustion chamber 17 is maintained substantially fixed regardless of the progression of the combustion cycle.

On the other hand, since the cooling loss is determined based on "cooling loss=heat transmissibility×heat transmission area×(gas temperature−partial face temperature)," the cooling loss becomes larger as a difference between the gas temperature and the wall face temperature becomes larger. To suppress the cooling loss, although it is preferred to reduce the difference between the gas temperature and the partial face temperature, when the temperature of the partial face of the combustion chamber 17 is maintained substantially fixed by the cooling water, it is unavoidable that the temperature difference increases due to the variation of the gas temperature. Thus, it is preferred to reduce a heat capacity of the heat-insulating layer 6 so that the temperature of each partial face of the combustion chamber 17 changes following the variation of the gas temperature within the combustion chamber 17.

The heat-insulating layer 6 may be formed by plasma thermal spray of a ceramic material (e.g., $ZrO_2$) to coat the mother member. The ceramic material may contain multiple micro-pores. In this manner, the heat conductivity and the volume specific heat of the heat-insulating layer 6 can be even lower.

Moreover, in this embodiment, as illustrated in FIG. 1, aluminum titanic acid-made port liners 181 having extremely low heat conductivity, excellent heat-insulating property and heat resistance property are integrally casted with the cylinder head 13 to provide the heat-insulating layers to the respective intake ports 18. With this configuration, a temperature increase of the cylinder head 13 by receiving heat when the fresh air passes through the intake ports 18 can be suppressed or avoided. Thus, the temperature of the fresh air introduced into the cylinder 11 (gas temperature in an early stage) becomes low, and therefore, the gas temperature in the combustion decreases, which is advantageous in reducing the difference between the gas temperature and the temperature of the partial face of the combustion chamber 17. Since the reduction of the gas temperature in the combustion can reduce the heat transmissibility, the configuration is also advantageous in reducing cooling loss. Note that the configuration of the heat-insulating layer provided to the intake ports 18 is not limited to the integral casting of the port liners 181.

In this embodiment, a heat-insulating layer is formed in the cylinder (combustion chamber 17) by a gas layer in addition to the heat-insulating structure of the combustion chamber 17 and the intake ports 18, so as to significantly reduce cooling loss.

Specifically, the engine controller 100 outputs the injection signal to the electric circuit of the fuel supply system 34 so as to inject the fuel into the cylinder from the nozzle port 41 of the injector 33 on the compression stroke. Thus, the gas layer containing the fresh air is formed in an outer circumferential section within the cylinder (combustion chamber 17) of the engine 1 and a mixture gas layer is formed in a center section within the cylinder (combustion chamber 17). In other words, by injecting the fuel into the cylinder by the injector 33 on the compression stroke and suppressing the strength (length) of the penetration of the fuel spray to the extent that the fuel spray does not reach the outer circumferential section within the cylinder, stratification can be achieved, i.e., the mixture gas layer is formed in the center section within the cylinder and the gas layer containing the fresh air is formed around the mixture gas layer. The gas layer may contain the fresh air alone or contain the burned gas (EGR gas) in addition to the fresh air. Note that a slight amount of fuel may be mixed in the gas layer as long as the fuel is leaner than the mixture gas layer so that the gas layer can function as the heat-insulating layer.

When the fuel self-ignites in the state in which the gas layer and the mixture gas layer are formed as described above, a flame caused in the mixture gas layer is prevented from contacting with the wall face of the cylinder 11 by the gas layer between the mixture gas layer and the wall face of the cylinder 11, and the gas layer serves as the heat-insulating layer and a heat release from the wall face of the cylinder 11 can be suppressed. As a result, cooling loss can be reduced significantly.

Note that the reduction of the cooling loss generally does not contribute much in improving indicated thermal efficiency by itself since the reduced amount of the cooling loss is converted into an exhaust loss; however, with the engine 1 of this embodiment by the high expansion ratio due to the high compression ratio, the energy of the combustion gas corresponding to the reduced amount of the cooling loss is efficiently changed into mechanical work. In other words, it can be said that the engine 1 significantly improves the indicated thermal efficiency by adopting the configuration with which both of the cooling and exhaust losses can be reduced.

Figure 3:
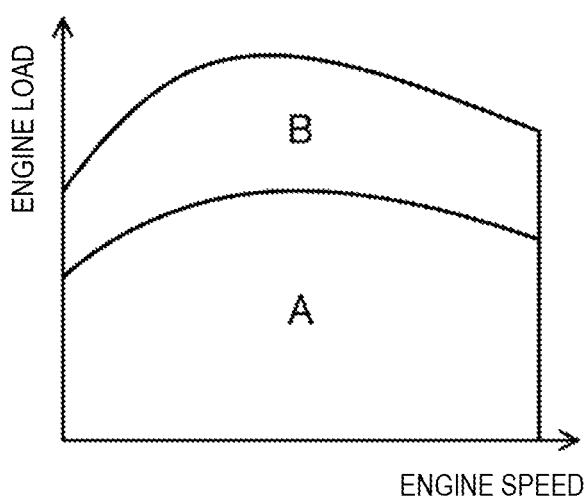
FIG. 3 is a map used for determining a mode of a self-ignition combustion.

The engine 1, in its entire operating range, causes a self-ignition combustion of the fuel injected from the injector 33 into the cylinder. More specifically, as illustrated in FIG. 3, the engine 1 has a normal operating range A corresponding to an operating range in which an engine load is low and medium, and a retard operating range B corresponding to an operating range in which the engine load is higher than that in the normal operating range A. A normal self-ignition combustion is performed within the normal operating range A, and a retarded self-ignition combustion is performed within the retard operating range B.

Within the normal operating range A, the fuel combusts by self-ignition, near a compression top dead center (CTDC). For example, a fuel injection start timing by the injector 33 is set to during the compression stroke. Within the normal operating range A, the engine controller 100 adjusts a fuel amount, a fuel injection timing, a fuel injection mode based on an engine speed, the engine load, and the effective compression ratio. Within the normal operating range A, a main combustion is started after the CTDC, but a fuel injection for maintaining the in-cylinder temperature after the CTDC, as performed within the retard operating range B described later, is not performed.

Note that, within the normal operating range A, the overall air excess ratio $\lambda$ within the cylinder (combustion chamber 17) may be set to 2 or a weight ratio of the gas with respect to the fuel within the cylinder (G/F) may be set to 30:1 or higher. Thus, the RawNOx can be reduced while improving the indicated thermal efficiency to achieve the heat insulation by the heat-insulating layer. In view of reducing RawNOx, the air excess ratio $\lambda \geq 2.5$ is more preferable. Moreover, the indicated thermal efficiency reaches its peak when the air excess ratio $\lambda=8$. Therefore, the air excess ratio λ is preferably within a range of 2≤λ≤8 (more preferably, 2.5≤λ≤8). Note that, since producing leaner mixture gas includes setting a larger opening of the throttle valve 20, it can contribute to improving the indicated thermal efficiency by reducing a gas exchange loss (pumping loss).

Within the retard operating range B, a pre-injection for producing a heat amount to be used for maintaining, for a period from the CTDC until the fuel injected in a main injection self-ignites, the in-cylinder temperature to the temperature substantially at the CTDC is performed, and also the main injection for causing the self-ignition combustion on the expansion stroke is performed. Hereinafter, the self-ignition combustion in which the ignition timing is retarded while maintaining the in-cylinder temperature after the CTDC by the pre-injection is referred to as the "retarded self-ignition combustion."

In the pre-injection, the fuel is injected by an amount corresponding to an air-fuel ratio which causes a partial-oxidative reaction of the injected fuel, and the pre-injection is for maintaining the in-cylinder temperature after the CTDC at a temperature where the fuel injected in the main injection can self-ignite for a predetermined period. In the pre-injection, although the oxidative reaction of the fuel occurs, it does not result in a hot flame reaction. Therefore, only the heat amount with which the decrease of the in-cylinder temperature after the CTDC can be suppressed is produced. In other words, the pre-injection is for maintaining the in-cylinder temperature after the CTDC while preventing the in-cylinder temperature from increasing excessively. By the pre-injection, the mixture gas after the CTDC expands in a state in which the temperature change is suppressed within a predetermined temperature range; in other words, the mixture gas after the CTDC substantially isothermally expands. Here, the substantial isothermal expansion is simply referred to as the "isothermal expansion."

An upper limit value of the predetermined temperature range is lower than a temperature at which the fuel injected in the main injection ignites before being mixed with the air inside the cylinder. A lower limit value of the predetermined temperature range corresponds to a temperature higher than a temperature obtained by performing the motoring to reduce the in-cylinder temperature at the CTDC. In other words, by the pre-injection, the in-cylinder temperature from the CTDC until the main combustion occurs is maintained to be lower than the temperature at which the fuel injected in the main injection ignites before being mixed with the air inside the cylinder, and higher than the temperature obtained by performing the motoring to reduce the in-cylinder temperature at the CTDC. For example, "the predetermined temperature range in width" is 100 degrees. More specifically, the in-cylinder temperature from the CTDC until the main combustion occurs is maintained between 1,000K and 1,100K.

The main injection is an injection for generating the main combustion that generates an engine torque (the combustion that produces a largest heat amount in a single cycle). In the main injection, the fuel is injected at a timing with which the fuel ignites while the variation of the in-cylinder temperature on the expansion stroke remains within the predetermined temperature range. Further, the main injection timing is set such that a combustion period of the main combustion overlaps with a timing at which a pressure increase rate within the cylinder during the motoring becomes the largest negative value (lowest rate). Here, the ignition corresponds to a timing at which a combustion mass ratio of the fuel becomes 10% or higher. For example, the main injection is performed after the CTDC, during the expansion stroke (more specifically, an early stage of the expansion stroke when the expansion stroke is divided into the early, intermediate, and final stages). Since the main injection causes the main combustion that generates the engine torque, the fuel needs to be injected by the amount corresponding to a required engine torque. For example, in the main injection, it is preferable to inject three-fourth (¾) or more of an entire injection amount of the fuel. The entire injection amount includes the injection amount of the pre-injection and the injection amount of the main injection.

When retarding the main combustion, there is a limit to the period that can be retarded. Specifically, as intake stroke progresses, the in-cylinder temperature decreases due to the in-cylinder volume increase, and therefore, if the main combustion is excessively retarded, misfire may occur. The decreasing speed of the in-cylinder temperature on the intake stroke is faster as the compression ratio is higher. Therefore, the retardable period becomes shorter as the compression ratio is higher. However, by using the pre-injection to maintain the in-cylinder temperature after the CTDC, the period for which the main combustion can be retarded can be extended.

Here, when increasing the in-cylinder temperature after the CTDC, if the in-cylinder temperature is excessively increased, the fuel injected in the main injection locally ignites before being sufficiently mixed with the air inside the cylinder, and soot may be generated. However, by the pre-injection, the variation of the in-cylinder temperature after the CTDC is suppressed within the predetermined temperature range, and thus, the excessive increase of the in-cylinder temperature is suppressed. As a result, the generation of soot by the local ignition of the fuel injected in the main injection can be suppressed.

Note that, within the retard operating range B, since the engine torque is prioritized, the overall air excess ratio λ within the cylinder may be set to 1.

Moreover, the combustion caused by the main injection (i.e., the main combustion) is advanced as the engine speed becomes higher. In other words, as the engine speed becomes lower, a period of time for which the fuel is exposed to a high temperature inside the cylinder becomes longer, and it becomes easier for an abnormal combustion to occur. Therefore, as the engine speed becomes lower, the main combustion is retarded to suppress the occurrence of an abnormal combustion. On the other hand, as the engine speed becomes higher, the time period for which the fuel is exposed to the high temperature inside the cylinder becomes shorter, and it becomes more difficult for an abnormal combustion to occur. Therefore, although the main combustion is basically retarded to reduce the pressure increase rate in the combustion, the combustion timing is advanced as the engine speed becomes higher compared to when the engine speed is lower.

Figure 4A:
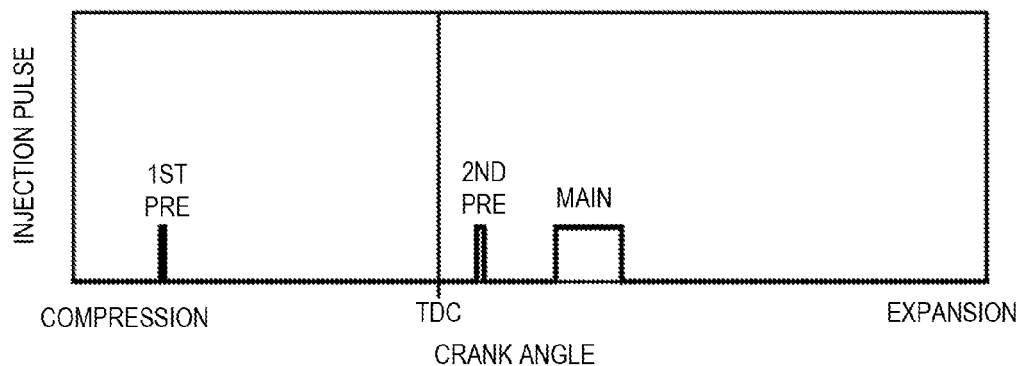
FIG. 4A is a view illustrating an injection mode for a retarded self-ignition combustion.
Figure 4B:
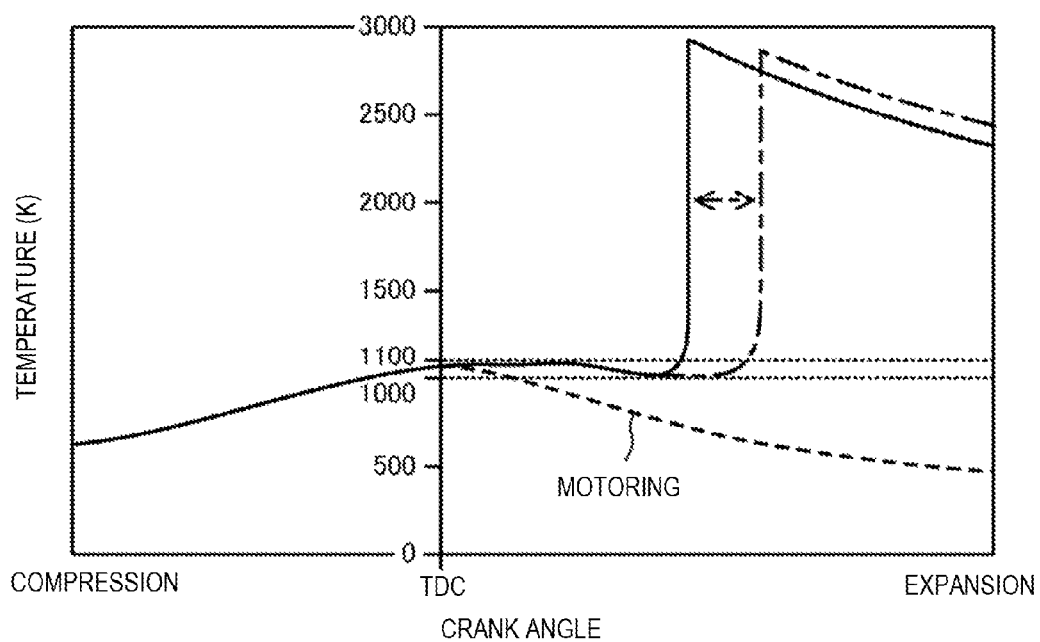
FIG. 4B is a view illustrating a change of an in-cylinder temperature.

Next, one example of the injection mode is described. In the example of FIG. 4A, the pre-injection is divided into a first pre-injection and a second pre-injection that follows the first pre-injection. The first pre-injection is for adjusting the in-cylinder temperature at the CTDC. In other words, the in-cylinder temperature at the CTDC becomes higher as the injection amount of the first pre-injection is larger. The second pre-injection is for adjusting the length of the temperature maintaining period after the CTDC (the period in which the variation of the in-cylinder temperature is maintained within the predetermined temperature range). In other words, the period in which the in-cylinder temperature after the CTDC is maintained substantially at the in-cylinder temperature at the CTDC becomes longer as the injection amount of the second pre-injection is larger (see the one-dot chain line in FIG. 4B). The first pre-injection is performed in a final stage of the compression stroke. The second pre-injection is performed near the CTDC (immediately after the CTDC).

The injection amount of the first pre-injection is 5% of the entire injection amount, and the injection amount of the second pre-injection is 15% of the entire injection amount. The injection amount of the main injection is 80% of the entire injection amount.

The entire injection amount of the first and second pre-injections and the main injection is set so that the overall air excess ratio within the cylinder becomes 1 (the air excess ratio $\lambda<1$ in the mixture gas layer). Thus, the torque can be secured and the exhaust gas can efficiently be purified by the three-way catalyst of the exhaust gas purification system.

In such an injection mode, the temperature maintaining period is adjusted mainly by the injection amount of the second pre-injection, and the retard amount of the main combustion is adjusted mainly by the main injection timing. For example, to increase the retard amount of the main combustion, the injection amount of the second pre-injection is increased to extend the temperature maintaining period, and the main injection timing is retarded to delay the ignition timing of the main combustion. Here, the in-cylinder temperature in the temperature maintaining period is adjusted mainly by the injection amount of the first pre-injection.

Note that, in the case where the pre-injection is not divided, the in-cylinder temperature at the CTDC and the length of the temperature maintaining period are adjusted by the injection amount of the single pre-injection.

Figure 5A:
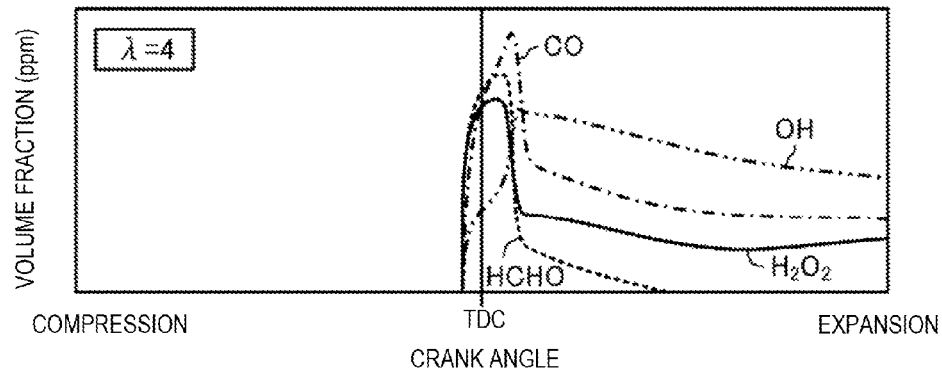
FIG. 5A is a view illustrating changes of amounts of respective intermediate products produced by combustion with respect to a crank angle when an air excess ratio λ is 4.
Figure 5B:
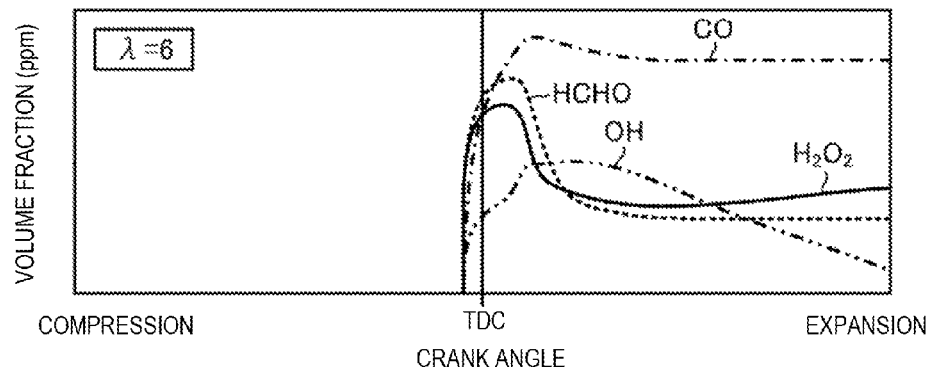
FIG. 5B is a view illustrating the changes of the amounts of the respective intermediate products produced by the combustion with respect to the crank angle when the air excess ratio λ is 6.
Figure 5C:
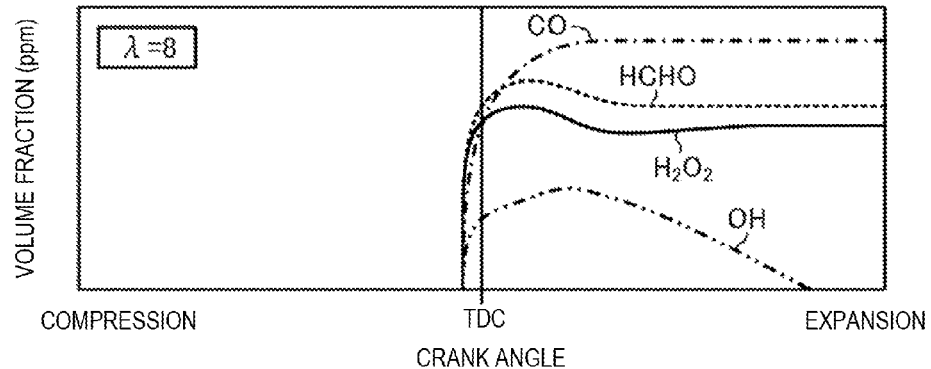
FIG. 5C is a view illustrating the changes of the amounts of the respective intermediate products produced by the combustion with respect to the crank angle when the air excess ratio λ is 8.
Figure 6:
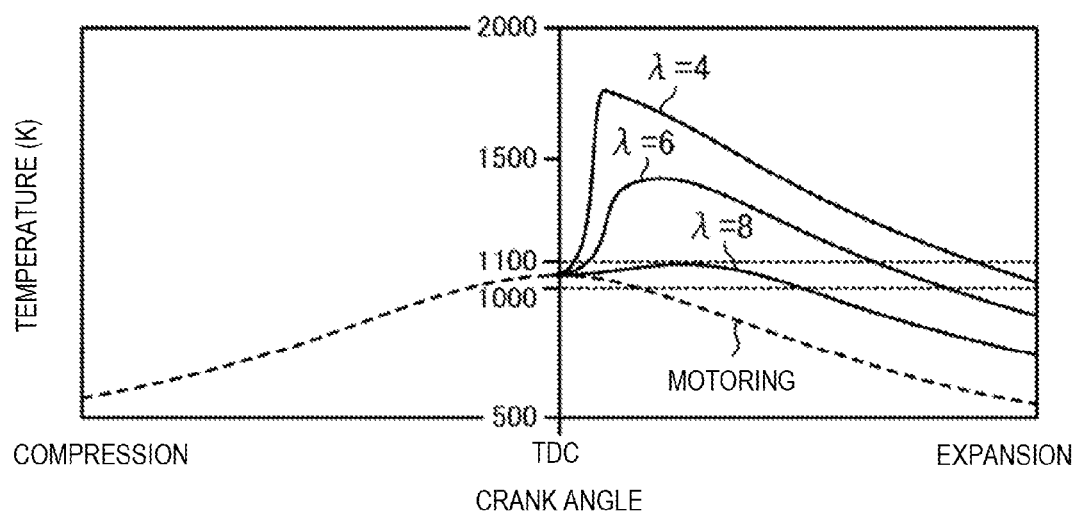
FIG. 6 is a view illustrating a change of the in-cylinder temperature when the air excess ratio λ in a pre-injection is changed.

Next, the isothermal expansion caused by the pre-injection is described in detail. FIG. 5A is a view illustrating changes of amounts of intermediate products produced by the combustion with respect to the crank angle when the air excess ratio $\lambda$ is 4, FIG. 5B is a view illustrating the changes of the amounts of the intermediate products produced by the combustion with respect to the crank angle when the air excess ratio $\lambda$ is 6, and FIG. 5C is a view illustrating the changes of the amounts of the intermediate products produced by the combustion with respect to the crank angle when the air excess ratio $\lambda$ is 8. FIG. 6 is a view illustrating a change of the in-cylinder temperature when the air excess ratio $\lambda$ in the pre-injection is changed.

The isothermal expansion caused by the pre-injection is achieved by adjusting the air-fuel ratio (air excess ratio) in the pre-injection. Specifically, as the mixture gas is produced to be leaner, the heat generation amount is reduced and the isothermal expansion can be achieved.

As illustrated in FIG. 5A, when the air excess ratio $\lambda$ is 4, as the crankshaft rotates, CO, $H_2O_2$ and HCHO are reduced, while OH is increased. Here, the reduction of CO indicates a conversion of CO into $CO_2$. Since the conversion of CO into $CO_2$ is accompanied with a large amount of heat generation, the in-cylinder temperature is significantly increased. Therefore, as illustrated in FIG. 6, when the air excess ratio $\lambda$ is 4, the in-cylinder temperature is increased sharply after the CTDC.

As illustrated in FIG. 5B, when the air excess ratio $\lambda$ is 6, the reduction amount of CO with respect to the crank angle is small. In other words, as the air-fuel ratio is set to be leaner, the conversion of CO into $CO_2$ becomes more difficult. As a result, when the air excess ratio $\lambda$ is 6, the increase of the in-cylinder temperature after the CTDC is gentle compared to the case where the air excess ratio $\lambda$ is 4 as illustrated in FIG. 6.

As illustrated in FIG. 5C, when the air excess ratio $\lambda$ is 8, the amount of CO is hardly changed even though the crankshaft rotates. In other words, CO is hardly converted into $CO_2$. This is because the fuel causes the oxidative reaction but does not result in a hot flame reaction. Thus, as illustrated in FIG. 6, the increase of the in-cylinder temperature after the CTDC can be suppressed. In the example of FIG. 6, the increase of the in-cylinder temperature after the CTDC is suppressed to a temperature higher than the in-cylinder temperature at the CTDC by 50 degrees or lower. Specifically, the in-cylinder temperature after the CTDC is suppressed to 1,100K or lower. On the other hand, even though it does not result in a hot-flame reaction, the fuel causes an oxidative reaction, and it produces a heat amount that is small to the extent that it can compensate the decrease of the in-cylinder temperature due to the expansion of the combustion chamber. As a result, even after the CTDC, the in-cylinder temperature is maintained about the same as the in-cylinder temperature at the CTDC, and the decrease of the in-cylinder on the expansion stroke is suppressed compared to during the motoring.

Figure 7A:
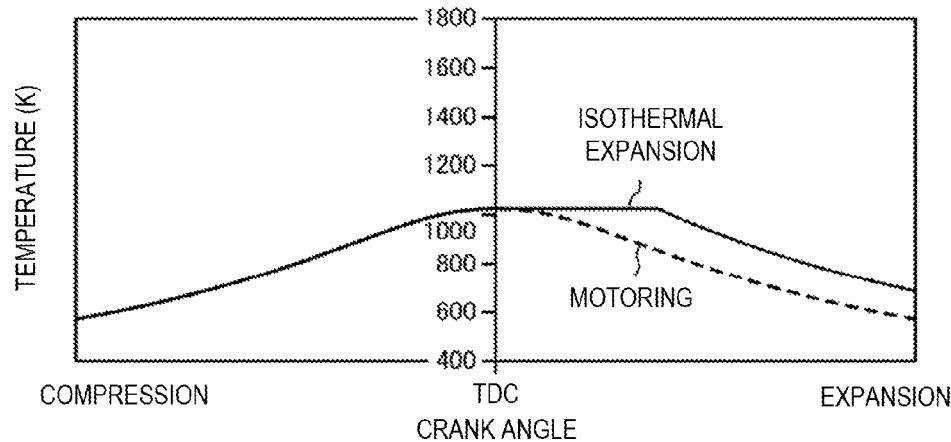
FIG. 7A is a view illustrating an in-cylinder temperature change with respect to the crank angle.
Figure 7B:
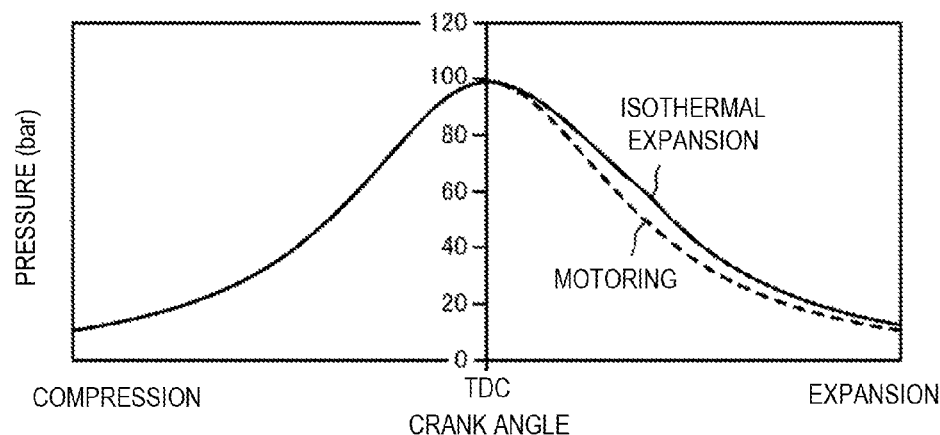
FIG. 7B is a view illustrating an in-cylinder pressure change with respect to the crank angle.
Figure 7C:
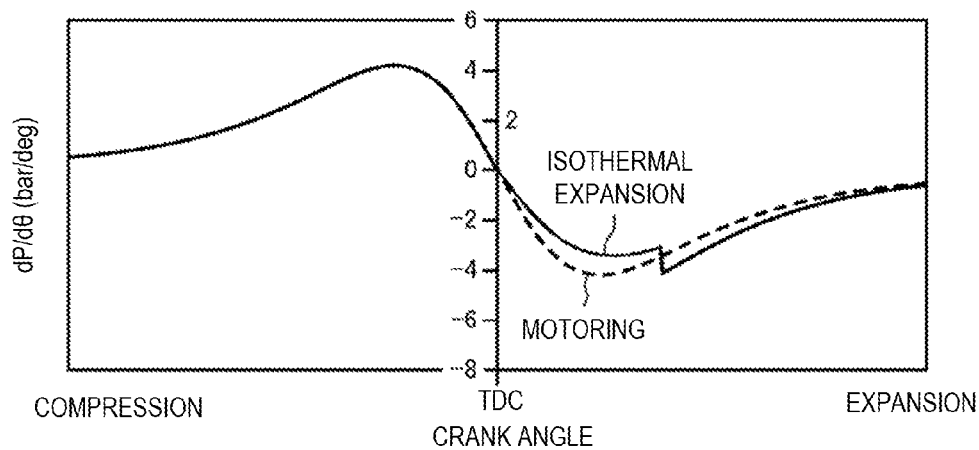
FIG. 7C is a view illustrating an in-cylinder pressure increase rate with respect to the crank angle.

Next, the in-cylinder temperature, the in-cylinder pressure, and the pressure increase rate with the isothermal expansion are described. FIG. 7A is a view illustrating the in-cylinder temperature change with respect to the crank angle, FIG. 7B is a view illustrating the in-cylinder pressure change with respect to the crank angle, and FIG. 7C is a view illustrating the in-cylinder pressure increase rate with respect to the crank angle. In FIGS. 7A to 7C, the change during the motoring is indicated by a dash line and the change by the isothermal expansion is indicated by a solid line.

On the compression stroke, the in-cylinder temperature during the motoring increases as it approaches the CTDC, reaches its highest temperature at the CTDC, and then decreases after the CTDC. Similar to this, on the compression stroke, the in-cylinder pressure during the motoring also increases as it approaches the CTDC, reaches its highest pressure at the CTDC, and then decreases after the CTDC. Here, the pressure increase rate is a positive value before the CTDC, reaches its highest value, for example, at around 10° before the CTDC, and becomes zero at the CTDC. The pressure increase rate becomes a negative value after the CTDC, and reaches its lowest value, for example, at around 10° after the CTDC.

On the other hand, by the isothermal expansion, on the compression stroke, the in-cylinder temperature increases as it approaches the CTDC, reaches its highest temperature at the CTDC, and then is maintained substantially at the temperature at the CTDC for a while (i.e., for the temperature maintaining period). Then, the in-cylinder temperature decreases. By the isothermal expansion, on the compression stroke, the in-cylinder pressure increases as it approaches the CTDC, reaches its highest pressure at the CTDC, and then decreases after the CTDC. Although this behavior is the same as that during the motoring, the in-cylinder pressure with the isothermal expansion is slightly higher than the in-cylinder pressure during the motoring, after the CTDC. Similarly, the basic behavior of the pressure increase rate with the isothermal expansion is the same as that during the motoring; however, the pressure increase rate on the expansion stroke is higher than that during the motoring only until the isothermal expansion ends. However, the pressure increase rate with the isothermal expansion on the expansion stroke is only slightly higher than that during the motoring.

To sum up, even if the heat amount with which the in-cylinder temperature can be maintained is produced by the pre-injection, the negative pressure increase rate after the CTDC becomes only slightly higher than that during the motoring. Even if the in-cylinder temperature after the CTDC can be increased, if the pressure increase rate after the CTDC also increases, although the main combustion can be retarded, the vibration noise (NVH) level cannot be reduced. In other words, by the pre-injection, since the in-cylinder pressure increase rate can be maintained low while suppressing the decrease of the in-cylinder temperature, the pressure increase rate in the combustion can be reduced by retarding the self-ignition combustion.

Figure 8A:
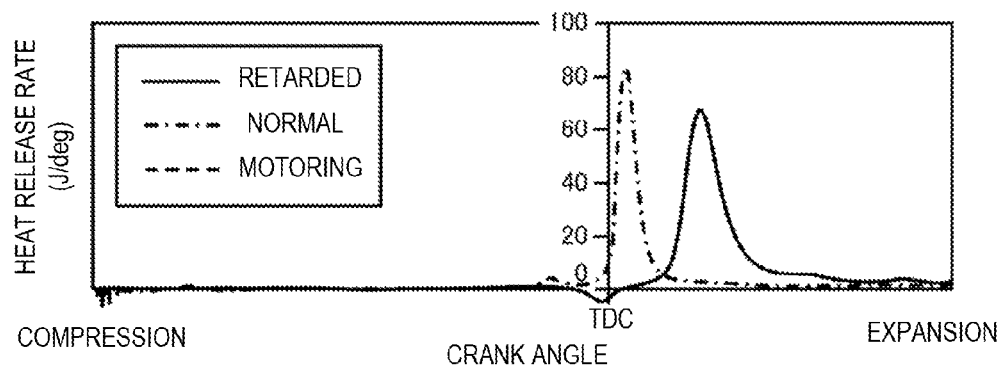
FIG. 8A is a view illustrating a change of a heat release rate which is one of the various parameters with the retarded self-ignition combustion.
Figure 8B:
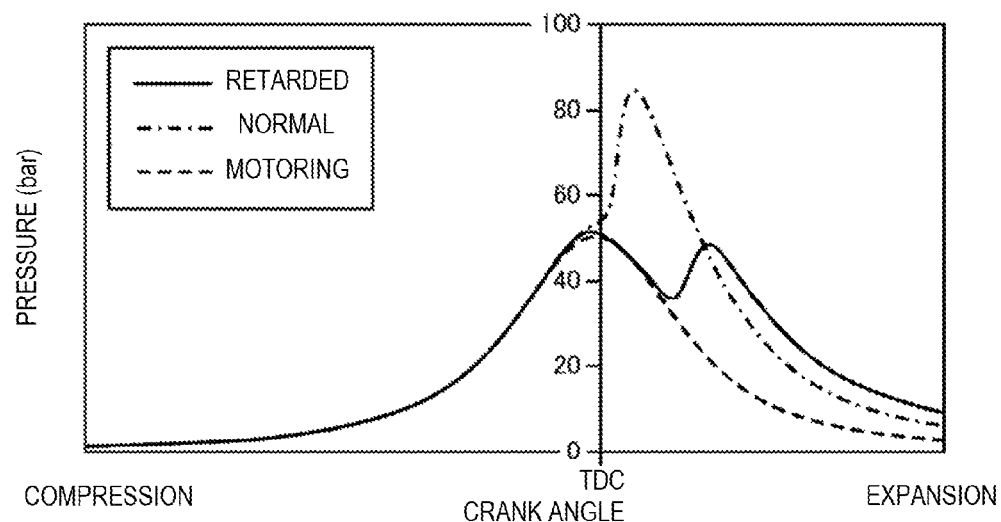
FIG. 8B is a view illustrating a change of an in-cylinder pressure which is one of the various parameters with the retarded self-ignition combustion.
Figure 8C:
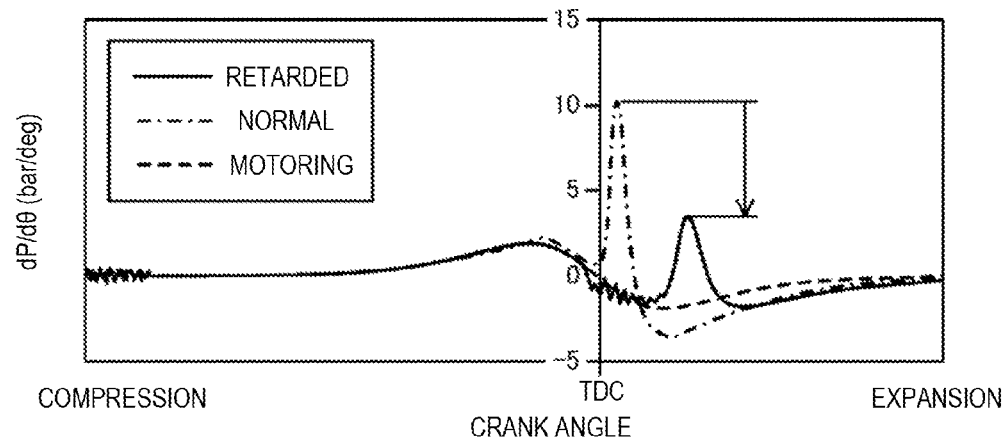
FIG. 8C is a view illustrating a change of a pressure increase rate which is one of the various parameters with the retarded self-ignition combustion.

Next, the heat release rate, the in-cylinder pressure, and the in-cylinder pressure increase rate with the retarded self-ignition combustion are described. FIG. 8A is a view illustrating the heat release rate, FIG. 8B is a view illustrating the in-cylinder pressure, and FIG. 8C is a view illustrating the in-cylinder pressure increase rate, in which the solid line indicates the retarded self-ignition combustion, the one-dot chain line indicates the normal self-ignition combustion (self-ignition combustion in which the fuel injection for maintaining the in-cylinder temperature after the CTDC (i.e., the pre-injection) is not performed). In FIGS. 8B and 8C, the values during the motoring are indicated by the dash line.

Note that, in FIGS. 8A to 8C, the geometric compression ratio of the engine is 25:1, the intake valve is closed at a timing corresponding to 80° after an intake bottom dead center (IBDC), and the engine speed is 1,000 rpm. With the retarded self-ignition combustion, the pre-injection is performed only once at a timing corresponding to 90° before the CTDC, and the main injection is performed at a timing corresponding to 3.6° before the CTDC. With the normal self-ignition combustion, the fuel injection is performed only once at a timing corresponding to 270° before the CTDC.

As illustrated in FIG. 8A, in the case of normal self-ignition combustion, the ignition is performed immediately after the CTDC and the heat release rate sharply increases. With the retarded self-ignition combustion, the ignition is performed at a timing that is after the CTDC and retarded than the normal self-ignition combustion, and the heat release rate increases. The heat release rate of the retarded self-ignition combustion reaches its peak at a timing about 10° to 20° after the CTDC. A period from the CTDC until the ignition is the period in which the in-cylinder temperature is maintained, and in this period, the heat release rate hardly increases. Moreover, the increase of the heat release rate is gentle with the retarded self-ignition combustion compared to the normal self-ignition combustion.

As illustrated in FIG. 8B, on the compression stroke, the in-cylinder pressure with the normal self-ignition combustion increases toward the CTDC, and then further increases due to the self-ignition combustion. On the compression stroke, the in-cylinder pressure of the retarded self-ignition combustion increases toward the CTDC, and reaches its local maximum at the CTDC. With the retarded self-ignition combustion, since the ignition timing is retarded, the in-cylinder pressure decreases once after reaching the local maximum at the CTDC, and then increases again due to the self-ignition combustion in the early stage of the expansion stroke. Then the in-cylinder pressure reaches its local maximum and decreases. The in-cylinder pressure of the retarded self-ignition combustion is substantially the same as the in-cylinder pressure during the motoring around the CTDC. Although the in-cylinder pressure with the retarded self-ignition combustion is slightly higher than the in-cylinder pressure during the motoring near the CTDC, the in-cylinder pressure with the retarded self-ignition combustion decreases similarly to the in-cylinder pressure during the motoring after the CTDC. Then, since another increase of the in-cylinder pressure due to the self-ignition combustion starts from the decreased point of the in-cylinder pressure after the CTDC, the local maximum value of the in-cylinder pressure caused by the self-ignition combustion is significantly smaller compared to the highest value of the in-cylinder pressure of the normal self-ignition combustion.

As illustrated in FIG. 8C, the pressure increase rate of the normal self-ignition combustion increases from immediately after the CTDC, reaches its highest value, and then decreases. On the other hand, the pressure increase rate of the retarded self-ignition combustion is a negative value for a while after the CTDC while decreasing as the expansion stroke progresses. Then, the pressure rate increases due to the self-ignition combustion in the early stage of the expansion stroke to become a positive value, reaches its highest value, and then decreases. The combustion period of the retarded self-ignition combustion (the period in which the combustion mass ratio of the fuel is between 10% and 90%) overlaps with the timing at which the pressure increase rate during the motoring becomes the largest negative value. In other words, the retarded self-ignition combustion originally occurs while the pressure increase rate is low. Therefore, the highest value of the pressure increase rate in the combustion of the retarded self-ignition combustion is significantly reduced compared to the highest value of the pressure increase rate in the combustion of the normal self-ignition combustion. As a result, the vibration noise (NVH) level of the retarded self-ignition combustion is significantly reduced compared to the vibration noise (NVH) level of the normal self-ignition combustion.

Therefore, the gasoline direct-injection engine 1 causes the self-ignition of the fuel injected into the cylinder by the injector 33 and at least containing gasoline, has the geometric compression ratio of 15:1 or higher, and includes the engine controller 100 for controlling the fuel injection by the injector 33. The engine controller 100 causes the injector 33 to perform the pre-injection for keeping the variation of the in-cylinder temperature after the CTDC within the predetermined temperature range by injecting the amount of the fuel which causes an oxidative reaction without resulting in a hot flame reaction. The engine controller 100 also causes the injector 33 to perform the main injection for causing the self-ignition combustion of the fuel after the CTDC while the variation of the in-cylinder temperature is kept within the predetermined temperature range, by injecting the fuel after the pre-injection.

According to this configuration, since the decrease of the in-cylinder temperature after the CTDC is suppressed by the pre-injection, the period for which the ignition timing of the self-ignition combustion can be retarded can be extended. Therefore, even with the engine with the high compression ratio in which the geometric compression ratio is 15:1 or higher, the ignition timing of the self-ignition combustion can be retarded to the timing at which the combustion period overlaps with the timing at which the pressure increase rate during the motoring becomes the largest negative value. As a result, the vibration noise level can be reduced.

Moreover, by suppressing the decrease of the in-cylinder temperature after the CTDC, the excessive increase of the in-cylinder temperature can also be suppressed. As a result, the fuel injected in the main injection locally can be suppressed from igniting before being sufficiently mixed with the air within the cylinder and generating soot.

Note that, as the method of reducing the pressure increase rate in the combustion, increasing an EGR amount can also be considered. However, if the EGR amount is increased, a fresh air amount is reduced, and sufficient torque cannot be secured. Particularly, the pressure increase rate may become an issue in the high engine load operating range depending on the value of the rate, and a large torque is required within the high engine load operating range. Therefore, with the configuration of maintaining the in-cylinder temperature by the pre-injection described above, since the fresh air amount can be secured, sufficient torque can be generated.

The predetermined temperature range in width is 100 degrees, etc. In other words, by the pre-injection, the variation of the in-cylinder temperature after the CTDC is settled within a range in width of 100 degrees. As a result, the decrease and excessive increase of the in-cylinder temperature after the CTDC are suppressed.

Moreover, the in-cylinder temperature, while its variation is settled within the predetermined temperature range, changes according to either one of the geometric compression ratio of the engine 1 and the effective compression ratio, and an operating state of the engine 1, and for example, the in-cylinder temperature is between 1,000K and 1,100K. Within this temperature range, the self-ignition combustion can be generated while suppressing the local ignition of the fuel injected in the main injection.

Moreover, while the variation of the in-cylinder temperature is settled within the predetermined temperature range, the in-cylinder pressure is reduced to be lower than the in-cylinder pressure at the CTDC.

In other words, even when the heat amount, which can maintain the in-cylinder temperature, is produced by the pre-injection, the in-cylinder pressure from the CTDC until the main combustion occurs can be lower than that at the CTDC.

Similarly, while the variation of the in-cylinder temperature is settled within the predetermined temperature range, the in-cylinder pressure increase rate is reduced to be lower than that at the CTDC.

Therefore, the pressure increase rate in the combustion can be reduced by retarding the self-ignition combustion, and the vibration noise (NVH) level can be reduced.

Moreover, in the pre-injection, the fuel is injected by an amount with which the air excess ratio becomes 8 or higher.

By setting the air excess ratio to 8, the fuel injected in the pre-injection causes an oxidative reaction without resulting in a hot flame reaction. As a result, the heat amount which can maintain the in-cylinder temperature can be produced without excessively increasing the in-cylinder temperature.

Moreover, with respect to the total injection amount of the fuel including the pre-injection and the main injection, the ratio of the injection amount of the fuel injected in the main injection is ¾.

According to this configuration, the injection amount of the main injection can be secured, and thus, sufficient torque can be generated.

The engine controller 100 advances the combustion by the main injection as the engine speed becomes higher.

In other words, as the engine speed becomes higher, the decreasing speed of the in-cylinder temperature on the expansion stroke becomes faster. Therefore, by advancing the combustion by the main injection as the engine speed becomes higher, the combustion caused by the main injection can surely be performed.

Second Embodiment

Next, a gasoline direct-injection engine 201 according to a second embodiment is described.

Figure 9:
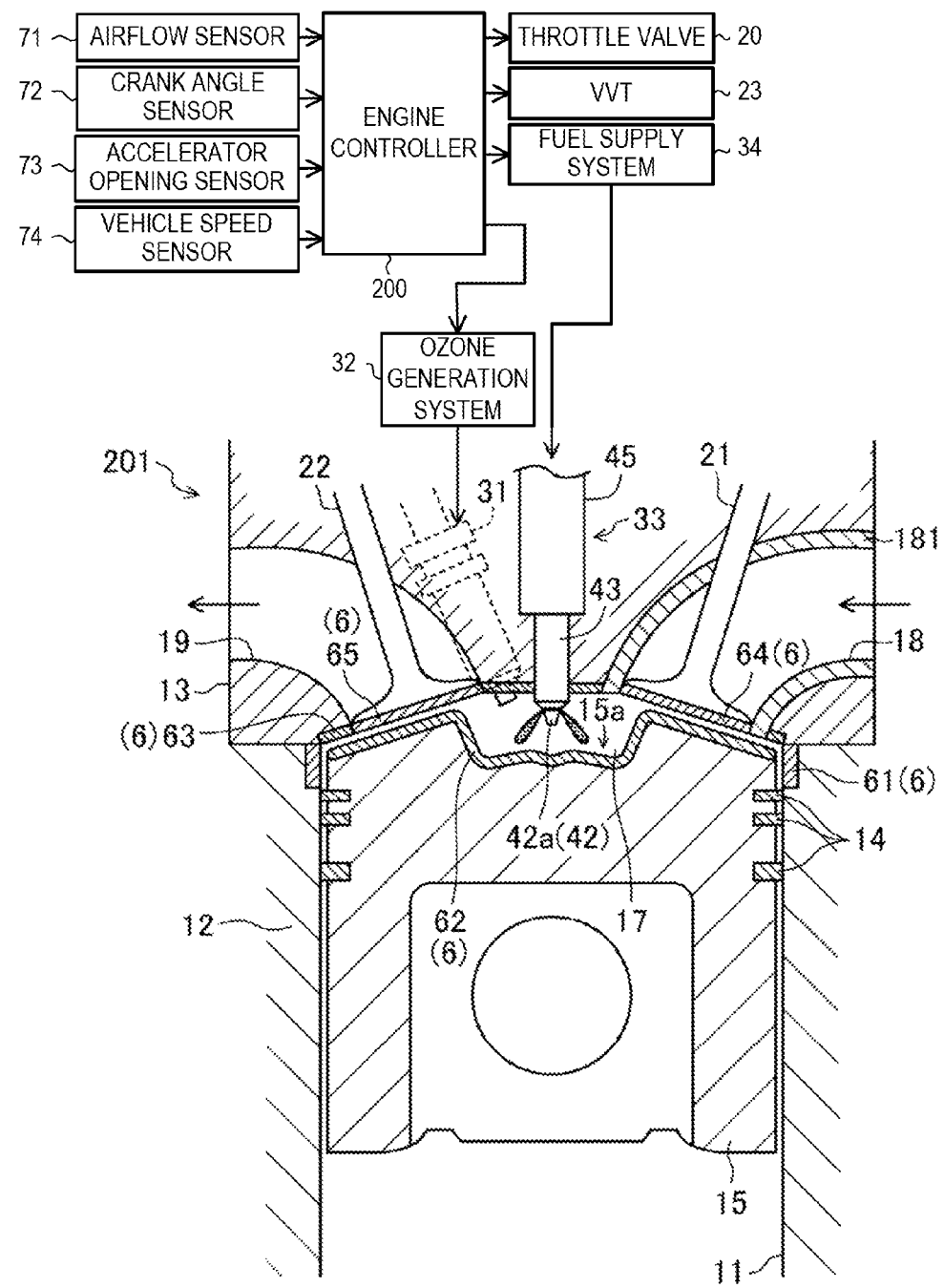
FIG. 9 is a schematic view illustrating a gasoline direct-injection engine according to a second embodiment of the present invention.

FIG. 9 is a view schematically illustrating the gasoline direct-injection engine 201. The engine 201 is different from the engine 1 of the first embodiment in having an ozone generator 31.

Specifically, the ozone generator 31 is disposed in the cylinder head 13 of the engine 201. The ozone generator 31 is fixed to the cylinder head 13 by a well-known structure (e.g., thread). An end part of the ozone generator 31 is oriented to the ceiling portion of the combustion chamber 17. The end part of the ozone generator 31 is positioned near the nozzle port 41 of the injector 33. The ozone generator 31 has two electrodes disposed to be insulated from each other and opposed against each other. The ozone generator 31 is operated by an ozone generation system 32. The ozone generation system 32 has an ozone generation circuit. The ozone generation system 32 receives a control signal from an engine controller 200 and outputs a high-frequency voltage at a high pressure, to the ozone generator 31. When high-frequency voltage is applied to the ozone generator 31, it generates ozone between the two electrodes. By changing either one of the magnitude and the frequency of the high-frequency voltage to be applied to the ozone generator 31, the concentration of ozone can be adjusted. Note that the arrangement and configuration of the ozone generator 31 are not limited to this.

Figure 10:
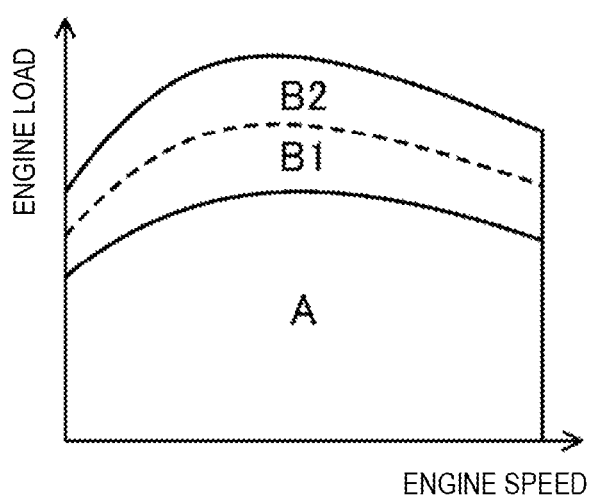
FIG. 10 is a map used for determining a mode of a self-ignition combustion according to the second embodiment.

In all the operating ranges, the engine 201 causes the self-ignition combustion of the fuel injected into the cylinder by the injector 33. More specifically, as illustrated in FIG. 10, the engine 201 has a normal operating range A corresponding to an operating range in which the engine load is low and medium, and a retard operating range B corresponding to an operating range in which the engine load is higher than that in the normal operating range A. A normal self-ignition combustion is performed within the normal operating range A and a retarded self-ignition combustion is performed within the retard operating range B. In the normal operating range A, a similar control to the engine 1 of the first embodiment is performed.

The retard operating range B includes a first operating range B1 where the retarded self-ignition combustion is performed without applying ozone, and a second operating range B2 where ozone is applied into the cylinder after a main injection and the retarded self-ignition combustion is performed. Within the second operating range B2, the engine load is higher than the operating range B1.

Within the first operating range B1, a similar control to the control of the engine 1 of the first embodiment is performed. In other words, the engine controller 200 of the engine 201 causes the injector 33 to perform a pre-injection for producing a heat amount which maintains the in-cylinder temperature substantially at the temperature at the CTDC from the CTDC until the fuel of the main injection self-ignites, and a main injection for causing the self-ignition combustion on the expansion stroke. In other words, within the first operating range B1, the engine controller 200 extends the retard period of the self-ignition combustion only by the pre-injection without an ozone application described later.

Within the second operating range B2, the engine controller 200 causes the ozone generator 31 to generate ozone after causing the injector 33 to perform the pre-injection and the main injection. The fuel injected into the cylinder in the main injection is energized by ozone and easily combusts by self-ignition. In other words, ozone assists the self-ignition combustion of the fuel.

According to the pre-injection, the decrease of the in-cylinder temperature after the CTDC can be suppressed, and thus, the period by which the self-ignition combustion can be retarded can be extended. However, even if the period that can be retarded can be extended, there is a limit. On the other hand, by applying ozone, the fuel can still self-ignite even if the ignition timing is retarded to a timing at which the ignition is difficult or impossible without the ozone application. Thus, within the second operating range B2, the engine controller 200 extends the retard period of the self-ignition combustion by the pre-injection and the ozone application.

Figure 11A:
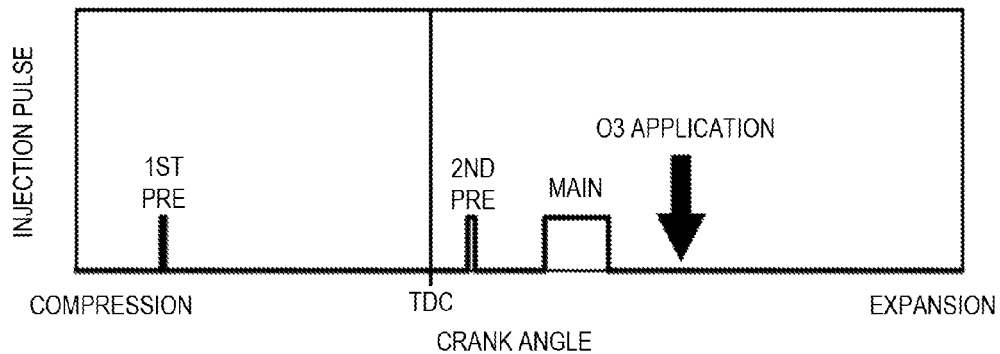
FIG. 11A is a view illustrating an injection mode for a retarded self-ignition combustion according to the second embodiment.

As one example, as illustrated in FIG. 11A, the engine controller 200 causes the injector 33 and the ozone generator 31 to perform a first pre-injection, a second pre-injection, the main injection, and the ozone application in this order. The first pre-injection is performed before the CTDC. The second pre-injection is performed immediately after the CTDC. The main injection is performed after the second pre-injection. The injection amount of the first pre-injection is 5% of the total injection amount, the injection amount of the second pre-injection is 15% of the total injection amount, and the injection amount of the main injection is 80% of the total injection amount. Then, the ozone application is performed after the main injection.

Here, the ozone application is performed when the in-cylinder temperature after the CTDC becomes lower than a predetermined temperature. The predetermined temperature is a temperature at which the self-ignition combustion of fuel can be performed even without the ozone application, i.e., a temperature corresponding to the lower limit value of the predetermined temperature range when the variation of the in-cylinder temperature from the CTDC until the fuel injected in the main injection ignites is maintained within the predetermined temperature range by the pre-injection in the first embodiment. In other words, ozone is applied in a situation where the self-ignition combustion of the fuel injected in the main injection is difficult by simply using the pre-injection to maintain the in-cylinder temperature after the CTDC.

Note that the timing of the ozone application is not limited to this. Ozone may be applied before the in-cylinder temperature after the CTDC becomes lower than the predetermined temperature. Even when the in-cylinder temperature is higher than the predetermined temperature, if the expansion stroke progresses and the in-cylinder pressure decreases, the self-ignition combustion of the fuel becomes difficult. Therefore, even when the in-cylinder temperature after the CTDC is higher than the predetermined temperature, the self-ignition combustion of the fuel may be assisted by the ozone application.

Figure 11B:
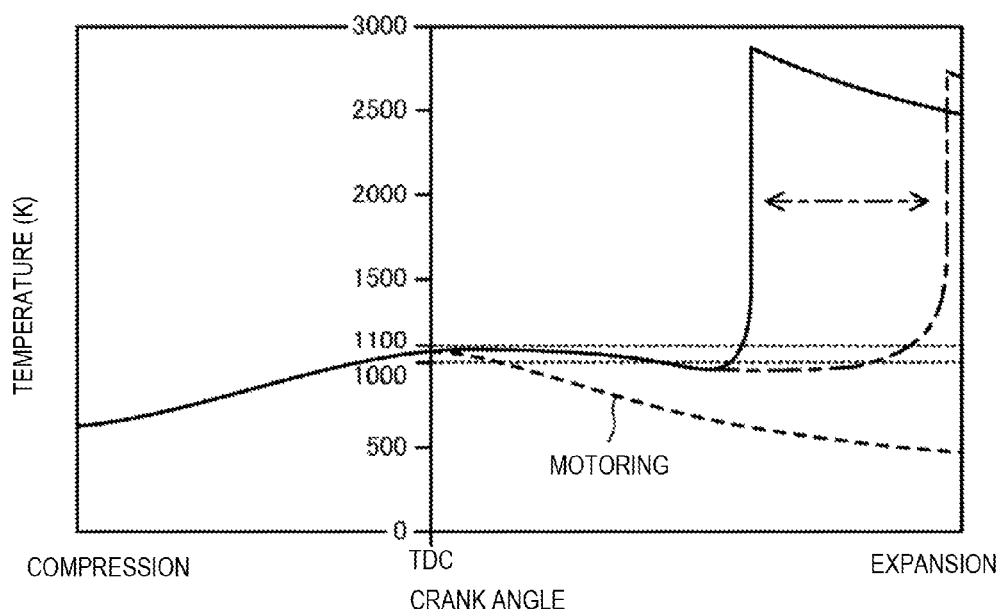
FIG. 11B is a view illustrating a change of an in-cylinder temperature according to the second embodiment.

In such an injection mode, the in-cylinder temperature at the CTDC is adjusted mainly by the injection amount of the first pre-injection, and the length of the period in which the in-cylinder temperature is maintained substantially fixed, mainly by the injection amount of the second pre-injection, is adjusted. Further, in a case where the injection timing of the main combustion is fixed, the retard amount of the main combustion is adjusted mainly by the application timing (generation timing) and concentration of ozone. Specifically, the ignition timing of the main combustion becomes later as the application timing of ozone is retarded (one-dot chain line in FIG. 11B). Moreover, the ignition timing of the main combustion becomes earlier as the concentration of ozone is increased (two-dot chain line FIG. 11B). Note that, actually, the retard amount of the main combustion is adjusted by changing the injection amount of the second pre-injection, the injection timing of the main combustion, and the application timing and concentration of ozone.

Moreover, the engine controller 200 retards the application timing of ozone as the engine speed becomes lower.

Further, the engine controller 200 retards the application timing of ozone as the engine load becomes higher.

When the application timing of ozone is retarded, the retard amount of the main combustion increases. As the engine load becomes higher, the in-cylinder pressure increase rate increases, and the vibration noise level increases. Thus, the application timing of ozone is retarded as the engine load becomes higher, to increase the retard amount of the main combustion. By increasing the retard amount of the main combustion as above, the pressure increase rate in the combustion is reduced and the vibration noise level when the engine load is high is reduced.

Therefore, the engine 201 also includes an ozone generator 31 for generating ozone within the cylinder 11. The engine controller 200 causes the ozone generator 31 to generate ozone after the main injection.

According to this configuration, ozone can assist the ignition of the combustion caused by the main injection. For example, when the retard period is long, the ignition becomes difficult since the in-cylinder temperature is low. In such a case, the ignition of the fuel can be facilitated by the ozone application.

Other Embodiments

As described above, the illustrative embodiments of the present invention are described. However, the present invention is not limited to these embodiments, and it can be applied to various embodiments with suitable changes, replacements, additions, omissions, etc. Moreover, a new embodiment can be obtained by combining the respective components described in the above embodiments. Furthermore, not all the components illustrated in the appended drawings and the above embodiments are essential in terms of achieving the main aim of the present invention, and they may include components which are unessential in terms of achieving the main aim of the present invention, for illustrating the present invention. Therefore, those unessential components should not instantly be recognized as essential only because they are illustrated in the appended drawings and the above embodiments.

The following configuration may be adopted to any of the above embodiments.

The engine is merely an example. For example, the engine is not limited to engines which cause self-ignition combustion in all the operating ranges of the engine.

Moreover, in the above embodiments, the heat-insulating structures of the combustion chamber 17 and the intake ports 18 are adopted and the heat-insulating layer formed by the gas layer is formed inside the cylinder (combustion chamber 17); however, the present invention may be applied to engines without the heat-insulating structures of the combustion chamber 17 and the intake ports 18, and engine without the heat-insulating layer formed by the gas layer.

The temperature range in width within which the variation of the in-cylinder temperature after the CTDC is settled is not limited to 100 degrees. The temperature range in width may be other values, such as 90 degrees or 110 degrees, as long as the abnormal combustion of the fuel can be prevented and the retarded self-ignition combustion can be performed.

Similarly, the in-cylinder temperature while the variation of the in-cylinder temperature is settled within the predetermined temperature range is not limited to between 1,000K to 1,100K. The in-cylinder temperature may be other values, such as between 950K and 1,100K, 1,000K and 1,150K, or 1,100K and 1,200K, as long as the abnormal combustion of the fuel can be prevented and the retarded self-ignition combustion can be performed.

Moreover, in the second embodiment, the pre-injection is divided into the first and second pre-injections; however, it is not limited to this. The pre-injection may be performed only once. In this case, the injection amount of the pre-injection may be changed with time. For example, the injection amount of the pre-injection may be adjusted to increase gradually.

As described above, the present invention is useful for direct gasoline engines.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS 1, 201 Engine
31 Ozone Generator
33 Injector
100, 200 Engine Controller (Controller)

What is claimed is:

1. A gasoline direct-injection engine for causing a self-ignition of a fuel injected into a cylinder by an injector and at least containing gasoline, comprising:
    a controller for controlling a fuel injection by the injector,
    wherein a geometric compression ratio of the engine is 15:1 or higher;
    wherein the controller causes the injector to perform a pre-injection for keeping a variation of an in-cylinder temperature after a compression top dead center within a predetermined temperature range by injecting an amount of the fuel that causes an oxidative reaction without resulting in a hot flame reaction;
    wherein the controller causes the injector to perform a main injection for causing self-ignition combustion of the fuel after the compression top dead center and while the variation of the in-cylinder temperature is kept within the predetermined temperature range, by injecting the fuel after the pre-injection;
    wherein the pre-injection is at least divided into a first pre-injection and a second pre-injection for injecting the fuel after the first pre-injection;
    wherein the first pre-injection is performed in an early stage of a compression stroke, and the second pre-injection is performed in an early stage of an expansion stroke before the main injection; and
    wherein the self-ignition is caused when an engine load reaches or exceeds a predetermined threshold value in a high load range.

2. The engine of claim 1, wherein the predetermined temperature range is 100 degrees Kelvin in width.

3. The engine of claim 2, wherein the in-cylinder temperature is between 1,000K and 1,100K while the variation of the in-cylinder temperature is kept within the predetermined temperature range.

4. The engine of claim 1, wherein an in-cylinder pressure is reduced to be lower than an in-cylinder pressure at the compression top dead center while the variation of the in-cylinder temperature is kept within the predetermined temperature range.

5. The engine of claim 4, further comprising an ozone generator for generating ozone within the cylinder,
    wherein the controller causes the ozone generator to generate ozone after the main injection.

6. The engine of claim 1, wherein in the pre-injection, the fuel is injected by an amount with which an air excess ratio becomes 8 or higher.

7. The engine of claim 6, wherein with respect to a total injection amount of the fuel including the pre-injection and the main injection, a ratio of the injection amount of the fuel injected in the main injection is ¾ or higher.

8. The engine of claim 1, wherein the controller advances the combustion caused by the main injection, as an engine speed increases.

9. The engine of claim 1, further comprising an ozone generator for generating ozone within the cylinder,
    wherein the controller causes the ozone generator to generate ozone after the main injection.

10. A gasoline direct-injection engine for causing a self-ignition of a fuel injected into a cylinder by an injector and at least containing gasoline, comprising:
    a controller for controlling a fuel injection by the injector,
    wherein a geometric compression ratio of the engine is 15:1 or higher;
    wherein the controller causes the injector to perform a pre-injection for keeping a variation of an in-cylinder temperature after a compression top dead center within a predetermined temperature range by injecting an amount of the fuel that causes an oxidative reaction without resulting in a hot flame reaction;
    wherein the controller causes the injector to perform a main injection for causing self-ignition combustion of the fuel after the compression top dead center and while the variation of the in-cylinder temperature is kept within the predetermined temperature range, by injecting the fuel after the pre-injection;
    wherein the pre-injection is at least divided into a first pre-injection and a second pre-injection for injecting the fuel after the first pre-injection;
    wherein the first pre-injection is performed in an early stage of a compression stroke, and the second pre-injection is performed in an early stage of an expansion stroke before the main injection;
    wherein the self-ignition is caused when an engine load reaches or exceeds a predetermined threshold value in a high load range;
    wherein the in-cylinder temperature is between 1,000K and 1,100K while the variation of the in-cylinder temperature is kept within the predetermined temperature range; and
    wherein with respect to a total injection amount of the fuel including the pre-injection and the main injection, a ratio of the injection amount of the fuel injected in the main injection is ¾ or higher.

* * * * *